Feb. 6, 1940.  W. VAN BUREN ET AL  2,189,692
SAFETY INNER TUBE FOR AUTOMOBILE TIRES
Filed April 28, 1937
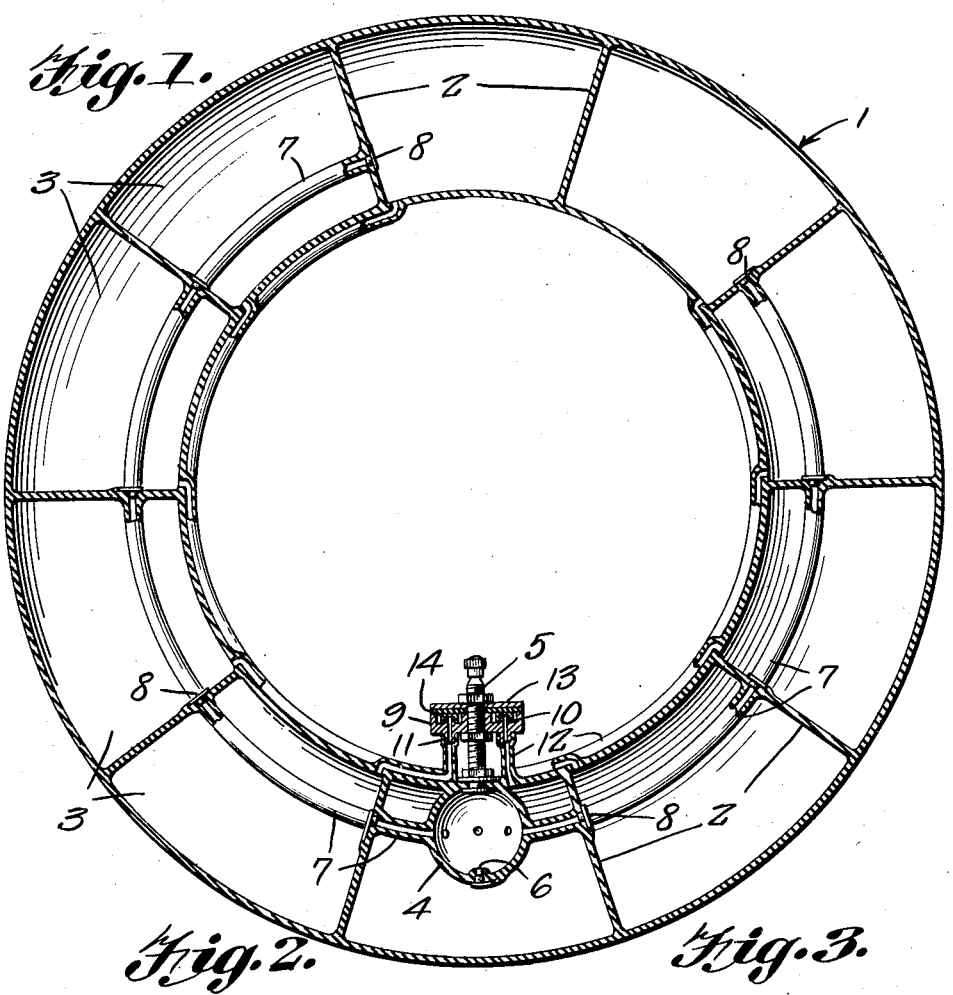
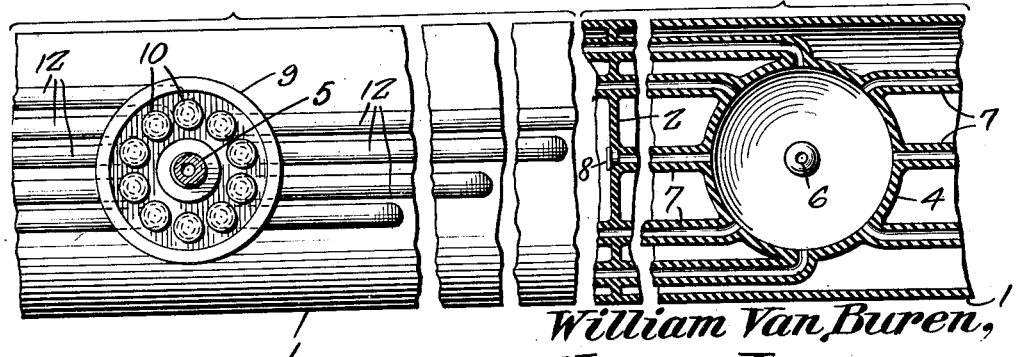
William Van Buren,
Nosmo Jones,
INVENTORS
BY Victor J. Evans & Co.
ATTORNEYS
WITNESS Patented Feb. 6, 1940

2,189,692

UNITED STATES PATENT OFFICE 2,189,692

SAFETY INNER TUBE FOR AUTOMOBILE TIRES

William Van Buren and Nosmo Jones, Detroit, Mich.

Application April 28, 1937, Serial No. 139,604

3 Claims. (Cl. 152—338)

This invention relates to inner tubes for pneumatic tires of motor vehicles and has for the primary object the provision of a device of this character which if punctured will lose only a small amount of its air pressure, eliminating complete and sudden deflation of the tire so that the tire will readily sustain its load and permit the vehicle to be brought to a stop with safety.

With these and other objects in view, this invention consists in certain novel features of construction, combination and arrangement of parts to be hereinafter more fully described and claimed.

For a complete understanding of our invention, reference is to be had to the following description and accompanying drawing, in which—

Figure 1 is a vertical sectional view illustrating an inner tube for pneumatic tires constructed in accordance with our invention.

Figure 2 is a fragmentary plan view partly in section showing series of by-pass tubes leading to a control valve for the purpose of deflating the inner tube.

Figure 3 is a fragmentary sectional view showing a plurality of tubes employed for connecting a main chamber to a plurality of air compartments within the tube.

Referring in detail to the drawing, the numeral 1 indicates an inner tube in which is located a series of partitions 2 for the purpose of forming the interior of the tube into a plurality of non-communicating air chambers 3. Located in one of the air chambers and forming an integral part of the inner tube is an air distributing chamber 4 having connected thereto a conventional type of inflating valve 5. A check valve 6 of the flap type places the chamber 4 in communication with the air chamber in which it is located. Connected to the air distributing chamber 4 is a plurality of tubes 7 each tube being connected to an air chamber 3 so that each air chamber 3 will be directly connected to the air distributing chamber 4. The tubes are equipped with check valves 8 acting to permit air under pressure to flow into the chambers 3 but which will prevent said air pressure from returning to the air distributing chamber 4.

A housing 9 is mounted on the inflating valve 5 and has located therein a plurality of valve seats 10 in the form of nipples 11 to which tubes 12 are connected. Each of these tubes lead to an air chamber 3 and are formed integral with the wall of the inner tube 1. A cover 13 is adjustably mounted on the inflating valve 5 and carries a gasket 14 which may be adjusted against the valve seats for closing the tubes 12 to prevent escape of air pressure from the chambers 3. However, when it is desired to deflate the air chambers 3 the cover 13 is adjusted on the valve stem away from the valve seats.

Should a nail or like obstacle penetrate the inner tube only one of the chambers 3 will be disturbed, consequently the remaining chambers of the tube retain their air pressure which is sufficient to sustain the load on the tire in which the inner tube is employed. To inflate the chambers 3 it is only necessary to connect the inflating valve with an air source.

A motor vehicle equipped with tires of the character described will permit the operator, in case of a puncture in any one of the tires, to proceed to a service station or like establishment before having to make a repair to the damaged tire, consequently relieving the operator of the burden of making tire changes on the road.

What is claimed is:

1. A pneumatic tire inner tube comprising a unitary annular tube which is provided with a plurality of transverse closure walls therein forming air pressure chambers therebetween, one of said chambers comprising a distributing chamber, valve means for introducing air under pressure into said distributing chamber, means carried by the distributing chamber for admitting air simultaneously into each of the said air pressure chambers, and means communicating with each of said air pressure chambers and functioning to simultaneously deflate the same.

2. A pneumatic tire inner tube comprising a unitary annular tube which is provided with a plurality of transverse closure walls therein forming air pressure chambers therebetween, one of said chambers comprising a distributing chamber, valve means for introducing air under pressure into said distributing chamber, a plurality of inflating tubular members within said annular tube, each of the said tubular members having valve controlled communication with one of the said air pressure chambers and with the said distributing chamber, means communicating with each of the air pressure chambers to simultaneously deflate the same, and means carried by the said first-mentioned valve means to manually simultaneously control the said deflating means.

3. A pneumatic tire inner tube comprising a unitary annular tube which is provided with a plurality of transverse closure walls therein forming air pressure chambers therebetween, one of said chambers comprising a distributing chamber, valve means for introducing air under pressure into said distributing chamber, a plurality of inflating tubular members within said annular tube having valve controlled communication with each of the said air pressure chambers and with the said distributing chamber, a plurality of deflating tubular members exteriorly of said annular tube having unrestricted communication with each of the said air pressure chambers at one end and communicating at the other end thereof with the first-mentioned valve means, and means carried by the first-mentioned valve means and coacting with the said deflating tubes to simultaneously deflate the said air pressure chambers.

WM. VAN BUREN.
NOSMO JONES.